United States Patent
Hakki et al.

(10) Patent No.: US 11,780,595 B1
(45) Date of Patent: Oct. 10, 2023

(54) SYSTEM, METHOD, AND APPARATUS FOR CONTROLLED DESCENT

(71) Applicants: A-Hamid Hakki, Dunedin, FL (US); Araam Hakki, Largo, FL (US); Haval Hakki, Largo, FL (US); Alan Hakki, Largo, FL (US)

(72) Inventors: A-Hamid Hakki, Dunedin, FL (US); Araam Hakki, Largo, FL (US); Haval Hakki, Largo, FL (US); Alan Hakki, Largo, FL (US)

( * ) Notice: Subject to any disclaimer, the term of this patent is extended or adjusted under 35 U.S.C. 154(b) by 0 days.

(21) Appl. No.: 18/055,430

(22) Filed: Nov. 15, 2022

(51) Int. Cl.
| | |
|---|---|
| *B64D 17/34* | (2006.01) |
| *B64D 17/24* | (2006.01) |
| *B64D 17/80* | (2006.01) |
| *B64D 17/18* | (2006.01) |

(52) U.S. Cl.
CPC ............. *B64D 17/34* (2013.01); *B64D 17/18* (2013.01); *B64D 17/24* (2013.01); *B64D 17/80* (2013.01)

(58) Field of Classification Search
CPC ........ B64D 17/34; B64D 17/18; B64D 17/24; B64D 17/80; B64D 17/22; B64D 17/00; B64D 17/343; B64D 17/48
See application file for complete search history.

(56) References Cited

U.S. PATENT DOCUMENTS

| | | | |
|---|---|---|---|
| 2,922,605 A * | 1/1960 | Turati | B64D 17/52 244/152 |
| 3,228,636 A | 11/1963 | Lemoigne | |
| 3,498,565 A | 7/1966 | Nash-Boulden | |
| 3,506,225 A * | 4/1970 | Snyder | B64D 17/36 244/149 |
| 3,837,604 A * | 9/1974 | Matsuo | B64D 17/34 244/152 |
| 4,078,744 A | 3/1978 | Heinrich | |
| 4,699,338 A | 10/1987 | Penberthy | |
| 6,631,872 B1 * | 10/2003 | Haggard | B64D 1/08 244/152 |

(Continued)

FOREIGN PATENT DOCUMENTS

| | | | | |
|---|---|---|---|---|
| CA | 2761825 A1 * | 11/2010 | ............... | B64D 1/08 |
| CA | 2747902 A1 * | 2/2012 | ............. | G07C 5/006 |

(Continued)

*Primary Examiner* — Assres H Woldemaryam
(74) *Attorney, Agent, or Firm* — Larson & Larson; Frank Liebenow; Justin P. Miller (57) ABSTRACT

A parachute structure includes two canopies. A primary canopy has a central air vent. The primary canopy is attached to an object by primary suspension lines for reducing the velocity of descent of the object. A secondary canopy captures air that exits from the central air vent of the primary canopy. The secondary canopy is attached to the object by control lines. Control of the direction and rate of descent of the parachute is accomplished by adjusting the length of the control lines by way of actuators to alter the distance between the secondary canopy and the primary canopy. Symmetrical changes in the length of suspension lines alter the velocity of descent of the object while asymmetric change steer of the object. In some embodiments, liquid jets ejected from the object increase deceleration and change direction and exterior air bags are deployed to cushion the object from damage.

14 Claims, 5 Drawing Sheets

(56) References Cited

U.S. PATENT DOCUMENTS

| | | | | |
|---|---|---|---|---|
| 8,016,239 B2* | 9/2011 | Hakki | ................... | B64D 17/80 |
| | | | | 244/152 |
| 8,794,567 B2* | 8/2014 | Adir | ..................... | B64C 15/14 |
| | | | | 244/52 |
| 10,336,432 B1* | 7/2019 | Farley | ...................... | B64B 1/62 |
| 10,518,888 B2* | 12/2019 | Vander Lind | ......... | B64D 17/20 |
| 2003/0127565 A1* | 7/2003 | Haffen | .................. | B64D 25/12 |
| | | | | 244/139 |
| 2003/0197095 A1* | 10/2003 | Preston | ................. | B64D 17/38 |
| | | | | 244/152 |
| 2006/0032984 A1 | 2/2006 | Preston | | |
| 2010/0032527 A1* | 2/2010 | Fox, Jr. | ................. | B64D 17/02 |
| | | | | 244/152 |
| 2021/0094692 A1 | 4/2021 | Driscoll et al. | | |
| 2022/0033094 A1* | 2/2022 | Holstine | ............... | B64D 17/36 |

FOREIGN PATENT DOCUMENTS

| | | | | | |
|---|---|---|---|---|---|
| DE | 4336056 | A1 | 4/1995 | | |
| ES | 0261099 | A | 2/1961 | | |
| RO | 122087 | B1 * | 12/2008 | ............ | B64D 17/34 |
| TW | 202007593 | A | 7/2019 | | |

* cited by examiner

SYSTEM, METHOD, AND APPARATUS FOR CONTROLLED DESCENT

FIELD OF THE INVENTION

This invention relates to the field of aeronautics and more particularly to a system for controlling directionality and descent of an object in air.

BACKGROUND OF THE INVENTION

Parachutes are typically constructed from a fabric that employs air resistance to control the fall of an object or being through air. Parachutes come in many sizes and shapes, all with the intent to increase air resistance and, therefore, slow the descent of the load (e.g., person or object).

As a solid sheet of material without any air escape tends to act more like a balloon, being relocated by air currents, some parachutes have been designed with air vents either between sections of the sheet or as a hole, for example, a hole in the top of the canopy. These air vents provide for a quicker descent and some degree of maneuverability through shortening of one or more attachment cables which causes the parachute to tilt and change direction.

When such a parachute has a hole at the top of the canopy, air escapes from within the canopy through the hole at a great force (mass times acceleration according to Newton's second law of physics) actually acting against the desired slower descent according to Newton's third law, that for every action there is an equal and opposite reaction.

Round canopy parachutes have been used, for example, to provide medical and other supplies to victims of natural disasters. They are ideal for large cargo that may be dropped from high altitudes and produce a large drag coefficient. Round canopy parachutes descend at a slow rate while carrying heavier cargo. The hemispherical shape of a round parachute is made up of panels or gores attached or sewn together and connected to suspension lines at the end of each panel so that the canopy will balloon as soon as air gets in the base of the hemisphere. Many such parachutes have a vent at the apex of the canopy to vent air out of the deployed parachute. While descending, round canopies are influenced by minimal steady movement of the canopy in and out as it descends related to the lift and drag of the parachute.

Traditional round parachutes comprise a pilot chute which is a small parachute that opens the larger main parachute, a bridal that connects the pilot chute to the main chute, a vent at the apex that allows a slow escape of air from the top of the main chute and prevents air from leaking out the sides of the canopy which would tend to rock the parachute widely as it falls. The canopy is the main part of the parachute; the skirt is the lower part of the canopy. Suspension lines attach to the skirt and spread the weight of the parachute equally across the canopy and there are links that connect the suspension lines to the risers. The risers connect the links to the load (e.g., a harness worn by a person). Control lines are used for steering and breaking.

As the parachute is deployed, air is trapped within the hemisphere of the canopy and creates air resistance that decelerates the parachute for a safe landing.

Some prior parachutes designed for airplanes with engine failure were deployed by firing a solid fuel rocket through the rear of an aircraft. Peterson et al (U.S. Pat. No. 6,224,019) used a small rocket that is connected to a small auxiliary parachute that once launched will drag main parachute for deployment. Round parachutes have been successfully used to safely land disabled aircrafts. The Cirrus Airframe Parachute System, certified in 1996, used small solid fuel rocket housed in the aft fuselage to pull the parachute out from its housing and deploy the canopy fully within seconds. The parachute system saves lives of the crew and passengers but does not prevent damage to the aircraft. Although saving lives remains the priority of any parachute system, overcoming their inherent limitations may result in even more improved design and functionality. For instance, the Cirrus Airframe Parachute System has several limitations that if overcome, may result in improved outcome.

The main drawbacks of existing airplane parachutes are sevenfold: First, the absence of a mechanism to counteract the force of air exiting the apex of the parachute resulting in acceleration of parachute descent based on Newton's third law of physics, that for every action there is an equal and opposite reaction. The second limitation is the inability to control the rate of descent or deceleration due to the fixed force of air exiting the apical vent. The third limitation is the lack of steering system to guide the parachute to a safe destination. The fourth limitation is the absence of exterior airbags and liquid propulsion jet system prior to imminent impact to decelerate the aircraft's downward velocity to near zero. The fifth limitation is that the landing aircraft is totally disabled upon impact with passengers suffering unavoidable deceleration injuries. The sixth drawback is that the load is confined to small aircraft due to the limited size of the parachute. The seventh limitation is the absence of microprocessors, sensors, global positioning detectors and laser to steer the parachute and cargo away from obstacles and dangerous landing locations such as power lines and highway traffic.

What is needed is a system that will control the rate and direction of deceleration of an object/person, steering away from dangerous objects during descent and minimizing injuries to person and damage to property upon impact.

SUMMARY OF THE INVENTION

A parachute structure has two canopies, a primary canopy having an air vent. The primary canopy is attached to an object by primary suspension lines for reducing the velocity of descent of the object. A secondary canopy captures air that exits through the vent of the primary canopy. The secondary canopy is attached to the object of the cargo by control lines. Control of the operational parameters of the secondary canopy is accomplished using input from GPS, cameras, surrounding wind velocity, laser, Doppler ultrasound and radar by onboard or remote computers that adjust the length of the control lines to alter the distance between the secondary canopy and the primary canopy. Symmetrical changes in the length of suspension lines alter the velocity of descent, while asymmetric change steer of the object. In some embodiments, deceleration is further enhanced using liquid jets exiting from reservoirs in the object in the direction of descent at velocities of about 1,000 meters per seconds, while steering is accomplished by liquid jets exiting in lateral directions. In some embodiments, just prior to impact, onion-shaped exterior airbags surrounding the cargo are deployed to exert a cushion effect.

In one embodiment, a parachute for controlling descent of an object, the parachute is disclosed including a primary canopy made from a sheet of a first material that has a primary canopy air vent centrally located in the sheet of the first material. Several primary lines connect the primary canopy to an object. A first end of each of the primary lines is affixed to an edge of the primary canopy and a second end of each of the primary lines affixed to the object. A secondary canopy is made from a sheet of material and has several control lines. A first end of each of the control lines is affixed to an edge of the secondary canopy and a second end of each of the control lines is connected to the object by an actuator such that, activation of the actuator shortens or lengthens an associated control line impacting changes to the direction of the object or speed of descent of the object as the object is suspended by the parachute in air above the ground.

In another embodiment, a method of controlling descent of an object is disclosed including connecting the object to edges of a primary canopy by several primary lines. The primary canopy has a primary canopy air vent centrally located in the primary canopy. Also connecting edges of a secondary canopy to the object by several control lines. Each control line passes through the primary canopy and is connected to the object by an actuator. The secondary canopy is smaller than the primary canopy, positioned above the primary canopy air vent, and is positioned to collect air exiting from the primary canopy air vent. The object is released in air above land and a horizontal direction of descent of the object is affected by controlling one or more actuator(s) to shorten or lengthen a subset of the control lines thereby redirecting the air directionally from the secondary canopy.

In another embodiment, a parachute for controlling descent of a disabled aircraft is disclosed including a primary canopy made from a sheet of material with a primary canopy air vent centrally located in the sheet of material. The object is connected to the primary canopy by primary lines. A first end of each primary line is affixed to an edge of the primary canopy and a second end of each primary line is affixed to the disabled aircraft by attachment points affixed to structural members of the disabled aircraft. A secondary canopy made from a sheet of a second material is controlled by several control lines. A first end of each control line is affixed to an edge of the secondary canopy and a second end of each control line is connected to the disabled aircraft by an actuator. Each actuator is anchored to the structural members of the disabled aircraft such that activation of the actuator shortens or lengthens an associated control line.

In some embodiments, a system is disclosed including a parachute structure comprising two or more canopies within one another attached to cargo for controlled descent.

In another embodiment, a method of controlled deceleration is disclosed including a canopy with conduits directing air escaping the vent of the canopy to control descent.

In another embodiment, a method of controlled deceleration is disclosed including a canopy with conduits directing air escaping the vent of the canopy to control direction and steering.

In some embodiments, a system for controlled descent of an object includes a parachute structure comprising primary and secondary canopies with adjustable length suspension lines. In some such embodiments, the secondary canopy or canopies harness the force of air exiting the vent of the primary canopy and directing the force of air exiting the vent in different directions. In some such embodiments, the secondary canopy or canopies control the effective area or volume of exit of the air escaping the vent of the primary canopy, thereby controlling the mass/force of the air exiting the primary vent towards directions to provide different accelerations and to influence the velocity and direction of the primary and secondary canopies carrying the object.

In some embodiments, a system uses parameters from the object's electronic systems to control the velocity and direction of movements of the object. As an example, GPS, cameras, wind velocity and direction, laser, ultrasound and radar are used to control the length of the respective suspension lines of the secondary canopy for controlling the velocity and direction of movements of the cargo.

In some embodiments, a remote ground or areal computer system controls the velocity and direction of movements of the object utilizing parameters from the object's electronic systems such as GPS, cameras, wind velocity and direction, laser, ultrasound and radar by controlling the suspension lines of the secondary canopy.

In some embodiments, the system uses inputs from the object's GPS, cameras, wind velocity sensors, lasers, ultrasound and radar to control the deployment of liquid deceleration jets and exterior airbags upon imminent impact.

In some embodiments, the system uses inputs from the object's GPS, cameras, wind velocity sensors, laser, ultrasound and radar to control the deployment of liquid jets exiting the object at velocities of about 1,000 meters per seconds using an incendiary device and reservoirs within the object at the time of impact to decrease descent velocity and limit damage.

In some embodiments, the system uses the inputs from the object's GPS, cameras, wind velocity sensors, laser, ultrasound and radar to control the deployment of liquid jets exiting the object at velocities of about 1,000 meters per seconds in lateral directions using an incendiary device and reservoirs within the object to steer the object in a desired direction.

In some embodiments, the system uses inputs from the object's GPS, cameras, wind velocity sensors, laser, ultrasound and radar to control the deployment of airbags (e.g., onion-shaped exterior airbags) from the object within 200 milliseconds before impact for effective deceleration and to minimize damage to the object or injury to occupants. The onion-shaped airbags are housed beneath the exterior of the object, with an effective surface area that equals the sum of individual layers of the airbag for smaller storage space and for improved cushion effect upon impact.

In some embodiments of the present invention, collision sensors and video cameras measure the instantaneous velocity of the parachute and upon prediction of impact, liquid jet propulsion and exterior airbag deployment is initiated to minimize the velocity upon impact.

As discussed, the force of air exiting the canopy vent acts to accelerate its rate of descent based on Newton's third law of physics. To overcome this force, a secondary (or tertiary) canopy is located within the primary canopy of the parachute and extent over the vent of the primary canopy. This secondary canopy resists the force of air exiting the vent of the primary canopy and transmits it via suspension lines to the fuselage frame of the aircraft or cargo pulling it in an upward direction causing deceleration. Further, the system controls the rate of air resistance by varying the distance of the secondary canopy from the vent directly influencing the rate of deceleration or descent of the parachute. The secondary canopy re-directs the force of the upward moving mass of air from the vent to more than one lateral direction to cause more deceleration as the lateral moving air currents intersect with the upward moving columns of air surround the primary canopy. In addition, this mechanism allows the use of a larger primary canopy vent (primary canopy air vent 93) to minimize excessive deceleration upon initial parachute deployment by a gradual decrease in effective vent area by decreasing the distance of the secondary canopy from the vent of the primary canopy. The system controls the lengths of the individual suspension lines of the secondary canopy and directly influences the quantity and force of air in any direction to effect steering of the parachute. The parachute moves opposite to the direction of the larger mass of air during steering. It is anticipated that, to reduce damage to the aircraft (or object) upon impact with the ground, exterior airbags surround the aircraft from all sides (see U.S. Pat. No. 7,523,891, Apr. 28, 2009) and/or liquid jet deceleration system (U.S. Pat. No. 10,723,351, Jul. 28, 2020). Such mechanisms will reduce deceleration and minimizing the risk of bodily injuries and aircraft damage. In some embodiments, the secondary canopy is controlled by a system of actuators controlled by a processor that utilizes cameras, laser detectors, and global positioning sensors to ensure safer landing.

Per Newton's second law: force=mass times acceleration and Newton's third law: for every action there is an equal and opposite reaction. The mass of exiting air and its direction is controlled by changing the distance of the secondary canopy from the apex vent of the primary canopy, thereby controlling deceleration and rate of parachute descent, and angle of the secondary canopy from the primary canopy's vent. Symmetrical increases or decreases of mass of air exiting the primary canopy results in controlled deceleration without change in direction of the parachute. Asymmetric increases or decreases of the volume (mass) of air exiting the primary canopy results in steering of the parachute in the direction of the least mass of exiting air. Since air mass exiting multiple directions is being controlled simultaneously (e.g., by way of a computer algorithm controlling actuators), both deceleration and steering are accomplished simultaneously and independently. The computer algorithms determine air flow based on input from a variety of sensors such as radar, ultrasound, video cameras, and laser guidance, and by global positioning sensing with respect to the preferred destination. In one embodiment, there are four or more sets of steering and deceleration cables that connect the secondary canopy skirt to the main frame of the cargo, each controlled by an actuator. Liquid ejection jets deployed by an incendiary causes deceleration if directed towards gravity, and results in change in direction if ejected in lateral directions.

Theoretical Considerations:

Terminal velocity of a falling mass is the constant velocity that a freely falling parachute reaches where air resistance prevents further acceleration. The main two forces are the force of gravity pulling the parachute and payload towards earth and the force of air resistance resisting the descent.

The volume of the parachute canopy hemisphere=volume of imaginary cylinder of air exiting the vent of the canopy in an upward direction.

Diameter of primary canopy 20 m
Radius of primary canopy=10 m
Diameter of main vent=4 m
Radius of main vent=2 m
Volume of canopy hemisphere 2,000 $m^3$
Speed of parachute=31-111 k/h.
A parachute speed of 100 k/h=30 m/s
Volume of vent cylinder of air=2,000 m3
(22/7)×(4 h)=2000
4h=14000/22
h=14000/88=159 m without gravity
159−(9.8×1×1)=about 150 m with gravity/s.
150 m/30 m/s=about 5 seconds.
H=159−5(9.8) (assuming 5 seconds to move all air from primary canopy)=about 110 m
Mass of 2,000 $m^3$ of air=1.29 kg×2000=2,580 kg
Force=Mass×Acceleration
Force=(2580 kg×30 m/s)−(2580 kg×9.8 m/s/s=(77,400)−(25,284)=52,116 Newton for each second of air freely exiting the primary canopy, or 52,116 divided by 5 seconds of gravity force of 9.8 m/s/s=10,423 Newton It takes about 5 seconds for 2,580 liters of canopy air to go through the parachute's 4-meter diameter vent assuming a velocity of 30 m/sec, not accounting for other factors such as negative pressure created by eddy air currents around the top of the canopy.

A force of 250 Newton can lift a mass of 75 kg. A force of 10,423 Newton can theoretically carry a mass of 3,127 kg, which is about 1.9 times the maximum weight of a hypothetical aircraft of 3,600 lbs. or 1,633 kg.

Parachute Designs:

Existing systems for aircraft parachutes have been utilized for small planes. These parachutes cause the plane to decelerate from speeds of about 175 miles per hour to about 10 to 20 mph within the time it takes to deploy the parachute. The parachute is stored in the rear of the aircraft and is fired by with a solid fuel rocket through the rear of windshield. The parachute is attached by high-strength lines to the aircraft wings, nose, and tail. However, according to aviation experts, the design is not likely to be applicable for large jets such as Boeing 747 which weighs over 900,000 pounds when full and travels at speeds that may exceed 600 mph (Saint Petersburg Times, Dec. 26, 2004).

The diameter of the parachute is about twice the length of the aircraft. In the prior example of the Cirrus SR-20, the parachute measured 26 feet in length, with maximum load weight of 3,000 pounds.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
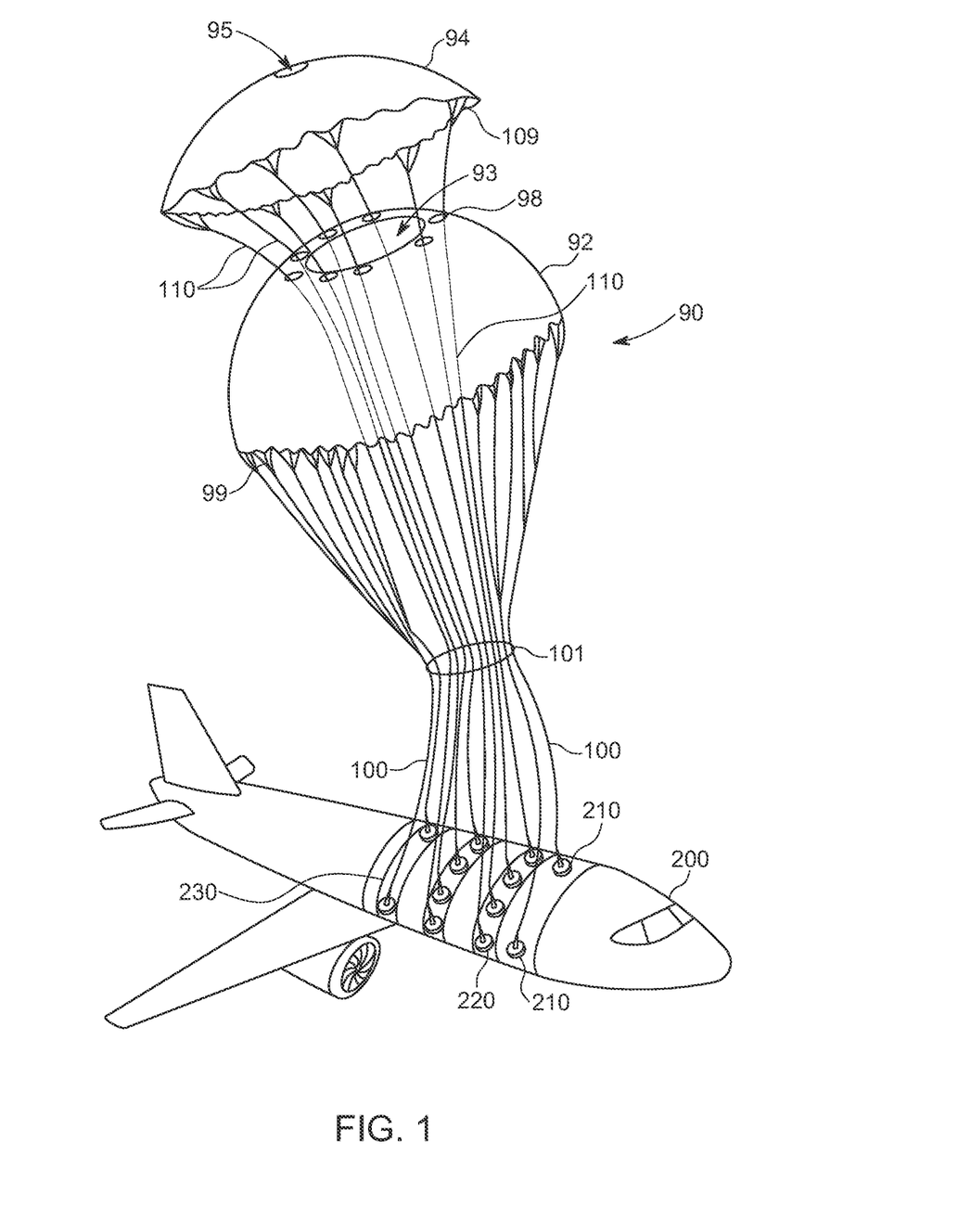
FIG. 1 illustrates a schematic representation of the disclosed parachute system used as a safety system for an aircraft.

Referring to FIG. 1, a safety deceleration system of the present invention includes a parachute system 90 that has been deployed from a storage bin of an object (e.g., aircraft 200 or a disabled aircraft). The parachute system 90 is typically stored in a parachute compartment of the object (e.g., aircraft 200). When used in conjunction with an aircraft 200, the parachute is deployed once an abnormal system function is detected, for example engine failure is detected.

Figure 2:
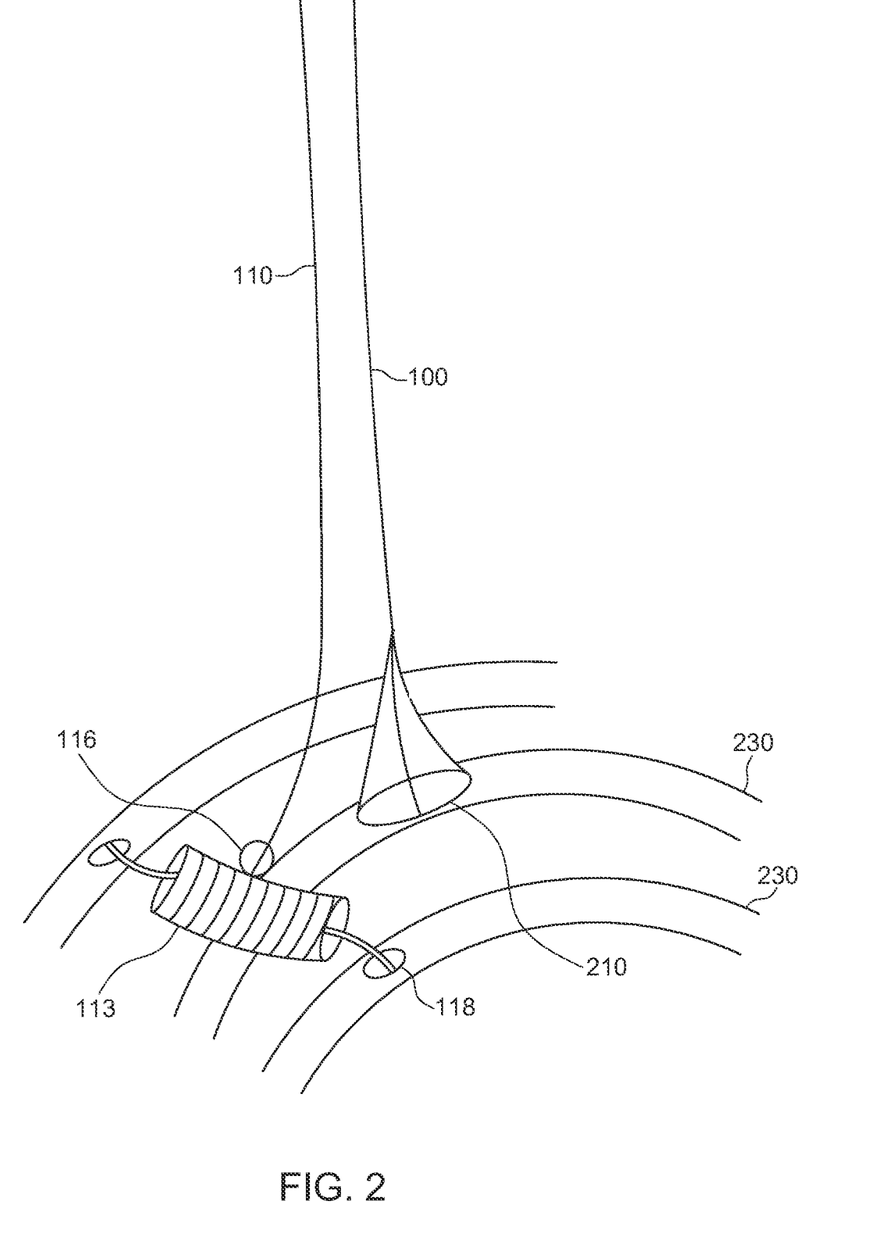
FIG. 2 illustrates a schematic view of the suspension lines to an object (e.g., the fuselage frame of an aircraft) and mechanism to shorten or lengthen the control risers for controlling the secondary canopy.

The parachute system 90 of the present invention is configured to provide enhanced control of descent and landing of any object (e.g., cargo, vehicles, skydivers), although an aircraft 200 is shown as an anticipated payload or object in FIGS. 1 and 2.

The parachute system 90 includes a primary canopy 92 and a secondary canopy 94. Both the primary canopy 92 and secondary canopy 94 are made of a sheet of material such as canvas, silk, Dacron, Kevlar, and/or nylon and there is no requirement that both the primary canopy 92 and the secondary canopy 94 be made of the same material.

The primary canopy 92 is attached to the aircraft 200 (or other payload) by a series of at least four primary lines 100 (e.g., cords, ropes, risers) affixed at one end to edges of the primary canopy 92 and at an opposing end to the object (e.g., aircraft 200) by attachment points 210 (e.g., anchors). In some embodiments, the attachment points 210 are affixed to structural elements 230 (e.g., frame) of the aircraft 200. In some embodiments, a constriction loop 101 is provided to control an angle of the primary lines 100. The primary canopy 92 has a primary canopy air vent 93 through which captured air flows when the parachute 90 is deployed.

The secondary canopy 94 is connected to the object (e.g., aircraft 200) by a series of at least four control lines 110 (eight are shown) that are affixed at one end to edges of the secondary canopy 94 and at an opposing end to the object (e.g., aircraft 200) by way of actuators 220 (e.g., motor driven spools, hydraulic or electric actuators). Note that it is fully anticipated that the actuators 220 be located at any location between the object (e.g., aircraft 200) and the secondary canopy 94. The control lines 110 pass through holes or eyelets 98 formed in an upper surface of the primary canopy 92, maintaining a position of the secondary canopy 94 centered and above the primary canopy air vent 93 (e.g., orifice) of the primary canopy 92. The secondary canopy 94 receives air flowing from the primary canopy air vent 93 and redirects the air to the sides of the parachute 90 and/or reduces flow of the air from the primary canopy air vent 93 to change a rate of descent of the parachute 90 and, therefore, the object (e.g., aircraft 200).

In some embodiments, the secondary canopy 94 has a secondary canopy air vent 95 to control inflation of the secondary canopy 94.

For control of descent and direction of the parachute system 90 and, therefore, descent of the object (e.g., aircraft 200), the control lines 110 are shortened or lengthened, moving a respective point of the secondary canopy 94 closer or further away from the primary canopy 92. As an example, shortening two of the control lines 110 on one side of the secondary canopy 94 redirects air that is escaping from the primary canopy air vent 93 towards an opposite side of the secondary canopy 94, thereby pushing the parachute system 90 in a direction of the control lines 110 that were shortened and, therefore, the object (e.g., aircraft 200), moves more towards a direction of the side of the control lines 110 that were shortened. In another example, by shortening all of the control lines 110, the amount of air that is able to flow through the primary canopy air vent 93 is reduced, thereby slowing a descent of the object (e.g., aircraft 200).

In some embodiments, the primary lines 100 include end branches 99 for connecting to the primary canopy 92.

Likewise, in some embodiments, the control lines 110 also include end branches 109 for connecting to edges of the secondary canopy 94.

Figure 3:
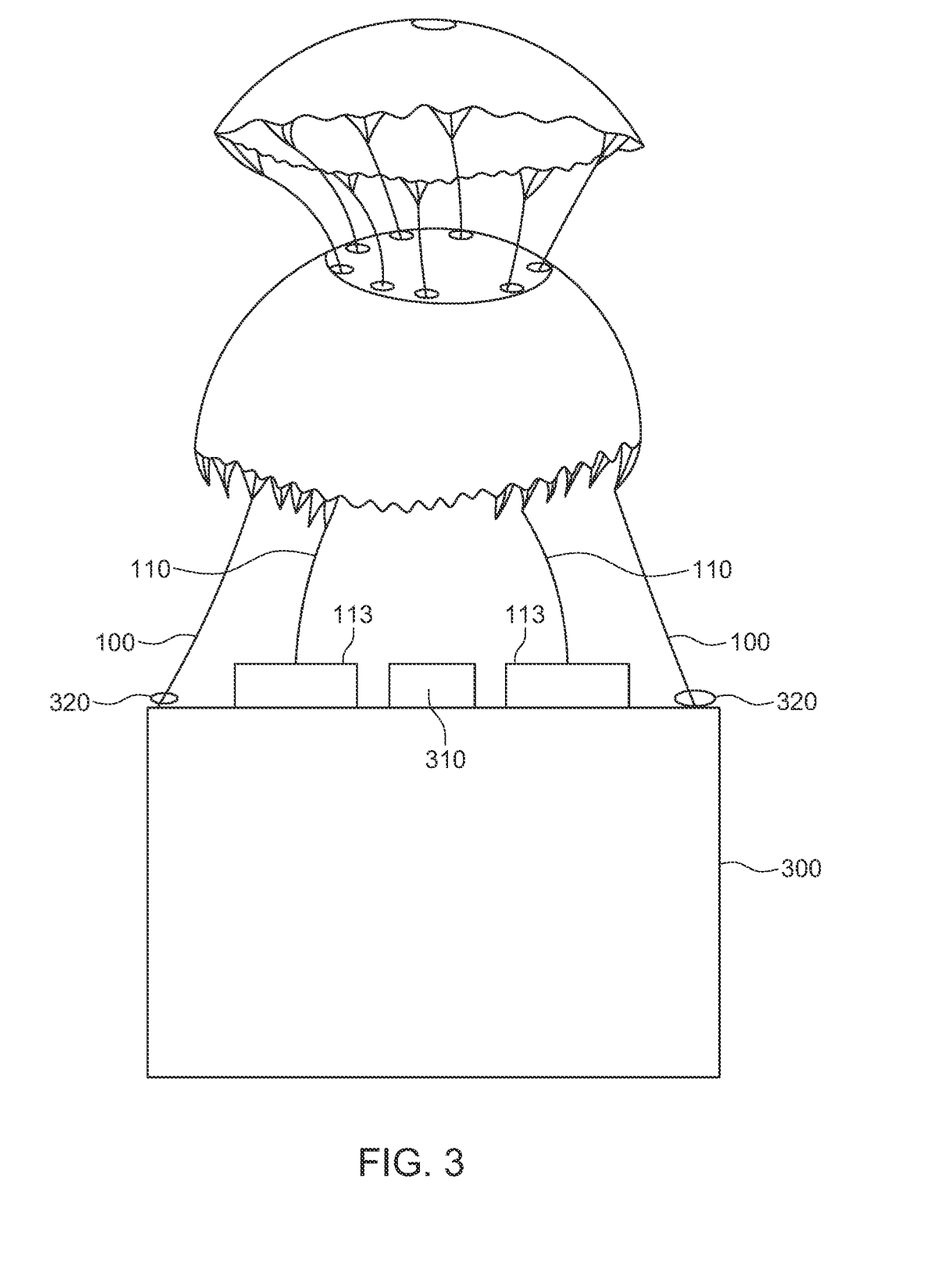
FIG. 3 illustrates a schematic view of the parachute interfaced to an object (e.g., cargo) with actuators for controlling the lengths of each of the control risers for controlling the secondary canopy by way of computer control.

Referring to FIGS. 2 and 3, an exemplary system for control of deceleration and steering is shown. In such, the object (e.g., aircraft 200) includes structural elements 230. The primary lines 100 are affixed to attachment points 210 that are affixed to the object 300 (e.g., aircraft 200), for example affixed to structural elements 230. The control lines 110 are connected to a device (e.g., spools 113) for independently (or in a group) controlling a length of each control line 110. By shortening or lengthening one, several, or all of the control lines 110, the secondary canopy 94 is pulled towards the primary canopy 92. As the distance between the primary canopy 92 and the object (e.g., aircraft 200) is substantially fixed by way of the primary lines 100, controlling the length of each control line 110 moves a respective edge of the secondary canopy 94 closer to or further away from the primary canopy 92. By controlling one or more of the control lines 110, air escaping from the secondary canopy 94 is directed to one side or kept within the primary canopy 92, thereby effecting horizontal movement and/or a rate of descent. Symmetrically decreasing the length of all control lines 110 will reduce air flow out of primary canopy air vent 93 and, therefore, increase the deceleration rate and velocity of the object (e.g., aircraft 200). Conversely, symmetrically increasing the length of all control lines 110 will increase the deceleration rate and increase descent velocity by increasing the distance between the secondary canopy 94 and the primary canopy 92 and increasing air flow out of the primary canopy air vent 93. Asymmetric shortening and lengthening of the control lines 110 will adjust the horizontal direction of the parachute to steer the object (e.g., aircraft 200) in a desired direction. For example, decreasing a length of the control lines 110 on one side of the secondary canopy 94 will direct air from the primary canopy air vent 93 towards an opposite side of the secondary canopy 94 and will move the parachute 90 and object generally in a direction of the side at which the control lines 110 were shortened. Having such control, it is possible to direct the object to a desired landing location.

In one embodiment, the parachute system 90 comprises a primary or primary canopy 92 and a secondary canopy 94 that extends above the primary canopy 92. Primary lines 100 (e.g., suspension lines) connect the primary canopy to attachment points 320 of the frame of the object 300 (e.g., aircraft 200, container, person, vehicle). The primary lines 100 are of generally fixed in length (note that with all such lines, there is an amount of stretching possible). The primary canopy 92 has a primary canopy air vent 93 at the vertex of the primary canopy 92. The primary lines 100 of the primary canopy 92 are attached to the edges of the primary canopy 92 and in some embodiments, converge to fewer lines. In some embodiments, the primary lines 100 pass through a constriction loop 101 some distance from the object 300 (e.g., aircraft 200, etc.). In some embodiments, the secondary canopy 94 is equipped with a smaller vent 95 and has end branches 109 where the control lines 110 attach to an edge of the secondary canopy 94. The control lines 110 pass through orifices 98 (e.g., grommets) near the secondary canopy air vent 95, passing through the primary canopy 92 and then to the object 300 (e.g., aircraft 200, container, person, vehicle). In some embodiments, to reduce tangling, the control lines 110 pass through holes 98 in the primary canopy 92. In some embodiments, the holes 98 are reinforced, for example, by grommets. There are, for example, 4, 6, 8, or more control lines 110 that interface to actuators 220 interfaced/affixed to the structural elements 230 of the object 300 (e.g., aircraft 200). Note that it is fully anticipated that in some embodiments, there is one actuator 220 per control line 110, and in some embodiments, two or more control lines 110 are interfaced to one actuator 220. In one embodiment, the length of the control lines 110 are controlled by spools 113. In some such embodiments, the control lines pass through rings 116 attached to spools 113 fixed to the structural elements 230 of the object (e.g., aircraft 200) by mounting points 118. The spools 113 rotate in a first rotational direction to shorten the associated control line 110 or rotate in an opposite rotational direction to lengthen the associated control line 110. In some embodiments, rotation of the spools 113 is controlled a computer 310. In such, data or inputs from the electronics (e.g., location measurement system or GPS, cameras, sensors for wind velocity and direction, laser, ultrasound and radar) associated with object 300 are processed by the computer 310 to control the spools 113, and therefore, to control the rate of descent of the object (e.g., aircraft 200) as well as direction and, therefore, projected landing location.

Figure 4:
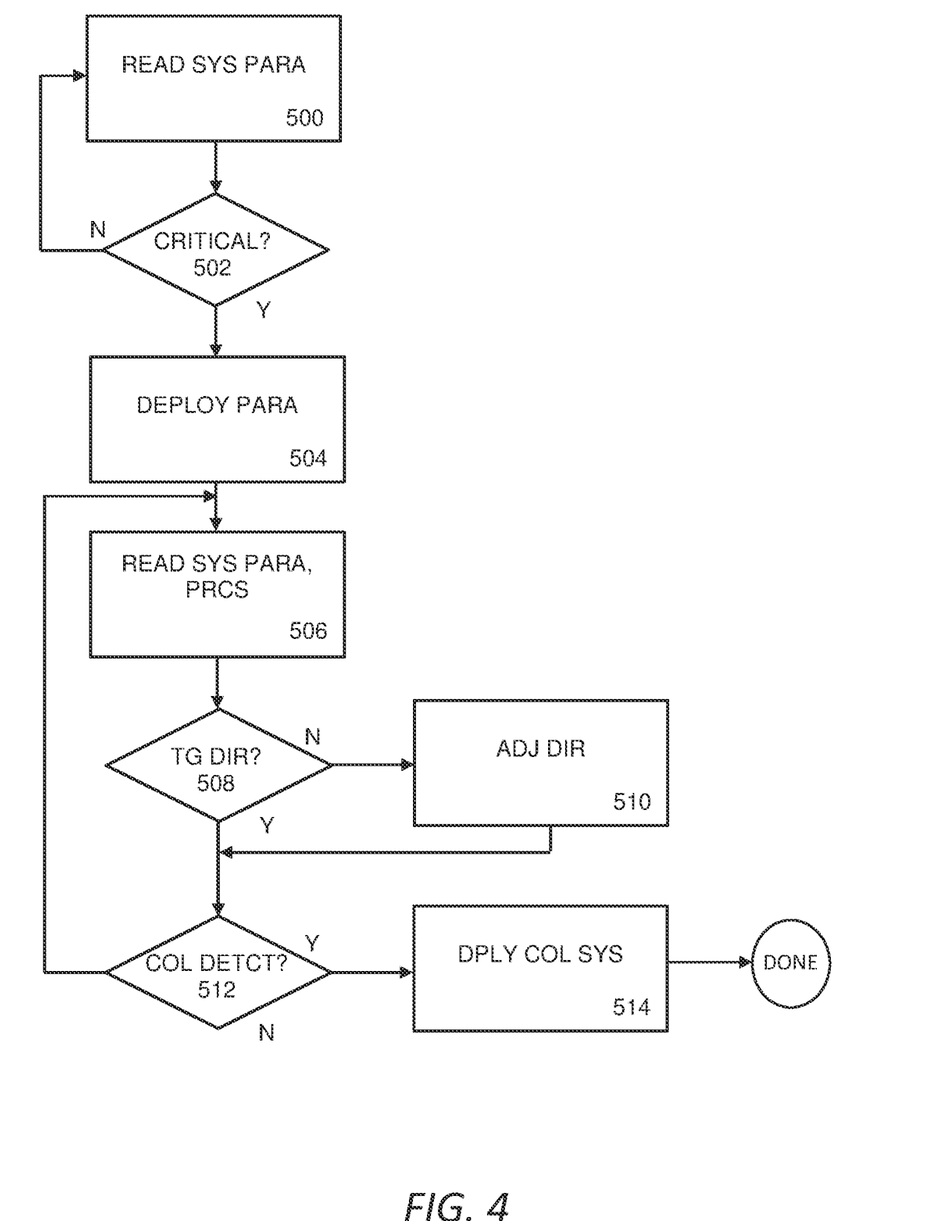
FIG. 4 illustrates a flow chart diagram of the algorithm underlying the deployment of the parachute system and control mechanism of deceleration and steering.

FIG. 4 illustrates a program flow used to trigger the deployment of the primary canopy 92 in case of an emergency such as engine failure and to control the rate of deceleration and velocity of the parachute and steering using the secondary canopy 94.

The computer loops, reading system parameters 500 and upon detection 502 of a critical situation (e.g., engine failure) the parachute is deployed 504. During decent, the computer 310 reads system parameters 506 such as a location from a location subsystem (e.g., GPS), images from cameras, parameters from lasers, wind velocity from sensors, distance from ultrasonic sensors, and radar and processes the data to guide the object (e.g., aircraft 200) on a particular route or direction to a safe landing location (e.g., target destination). If the system parameters indicate that the object (e.g., aircraft 200) is not progressing correctly towards the target destination 508, then the computer uses the actuators 220 to control lengths of at least one control lines 110 (e.g., an associated control line) to modify or adjust 510 the direction and velocity of descent. When the processing of the system parameters 506 indicates collision 512 (e.g., landing), in some embodiments, a collision damage deduction system is deployed 514, for example air bags and/or high-velocity fluid emission.

In some embodiments, the safety system of the present invention further includes a plurality of independent sensors for measuring parameters such as direction and velocity or uses sensors of the object (e.g., aircraft 200) such as the speed of the aircraft 200, wind speed, weight of the aircraft 200, distance to an obstacle/ground, time to impact, deceleration rate, dimensions or lengths of individual suspension lines, volume, force and velocity of activated liquid jets, volume and timing of deployment of exterior airbags, etc. Liquid deceleration systems are disclosed in U.S. Pat. No. 10,723,351, issued Jul. 28, 2020, and included by reference. Exterior airbag systems are disclosed in U.S. Pat. No. 7,523,891, issued Apr. 28, 2009, and included by reference.

In another embodiment, the parachute system 90 is housed above the fuselage frame of an aircraft 200. The skin overlying the fuselage frame contains flaps or doors that open outward just prior to parachute deployment by mechanical means or incendiary (not shown) to allow expulsion of the parachute outside and above the aircraft within a span of milliseconds. Upon engine failure, the computer 310 initiates the deployment of the parachute. Using an incendiary device, the parachute will exit its storage location, unfold, and the canopies 92/94 will fill with air causing deceleration of the aircraft 200.

In another embodiment, compartments have 10 gallons of liquid and are located around the outside frame of the fuselage (not shown) of the aircraft 200. These compartments provide for a liquid deceleration and add less than 40 kg to the 1,600 kg weight of and aircraft 200. The compartments are configured to deploy the liquids by, for example, explosive charge. When the liquid is deployed in the direction of decent and just before impact, significant deceleration occurs within 50 milliseconds. When deployed in a lateral direction, the horizontal location of the aircraft 200 is changed dramatically in a very short interval of time. For example, equipping the aircraft with 10 exterior airbags adds no more than 40 kg to the weight of the aircraft 200 and provide an effective cushion upon impact.

In some embodiments, an audio video image recording includes a plurality of cameras, preferably rapid exposure rate cameras with continuous loop recording equipped with audiovisual capability located at different locations both outside and inside the cargo (or aircraft 200). Cameras equipped with audio and video capability located at different locations and outside and inside the vehicle such as aircraft to record events occurring moments just before, during and after impact or, any imminent internal or external emergency. The system provides for storage and later retrieval and analysis of images in a black box or other suitable safe storage location within the vehicle or aircraft. In some embodiments, the cameras or image sensors incorporate night vision by way of infrared tools and flash mechanisms.

Figure 5:
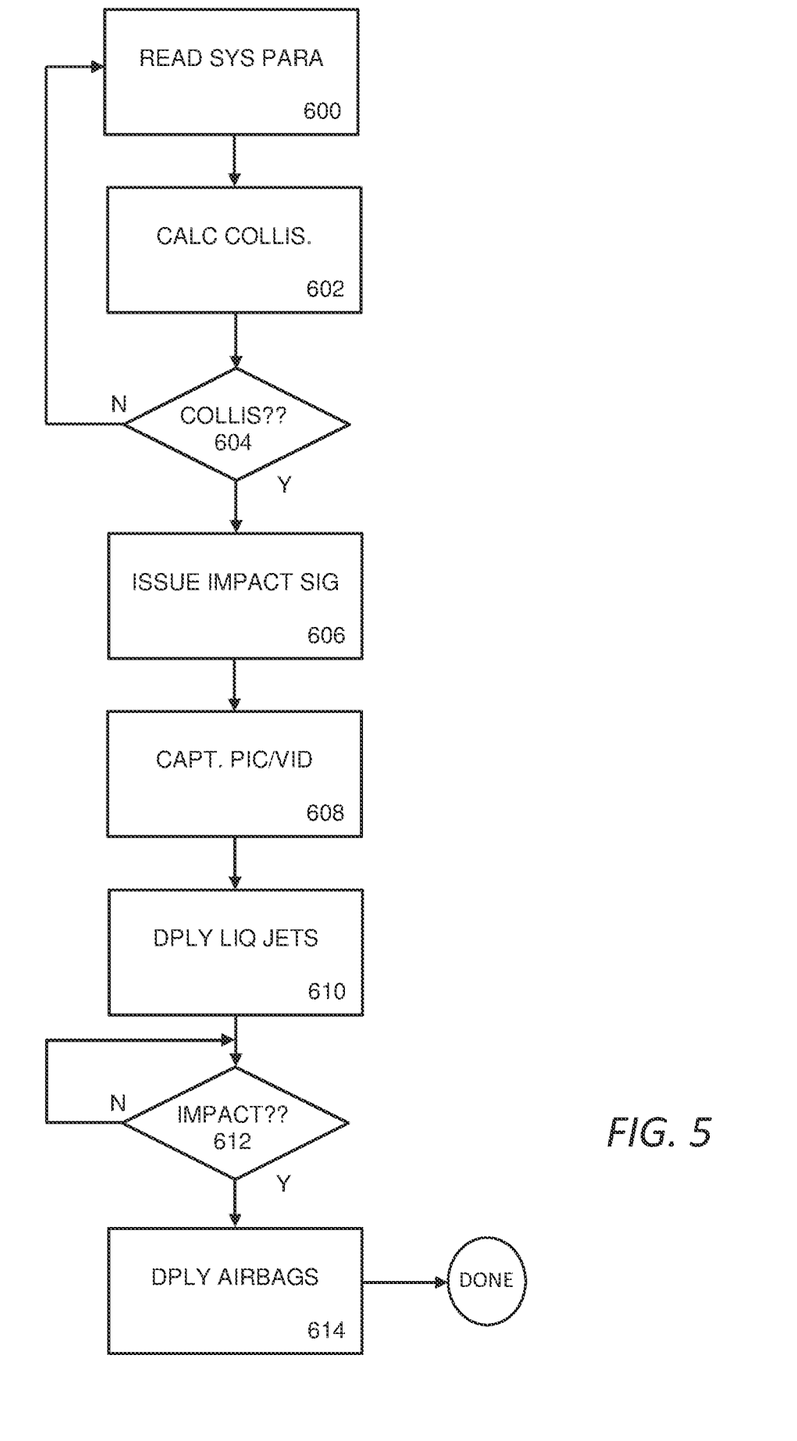
FIG. 5 illustrates a flow chart diagram of the algorithm underlying the deployment of the liquid deceleration and exterior airbags prior to imminent ground impact.

Referring to FIG. 5, a flow chart diagram of the algorithm underlying the deployment of the liquid deceleration and exterior airbags prior to imminent ground impact is shown. The computer loops, reading system parameters 600 and calculates a time of collision 602. When the time of collision is very near 604 (e.g., less than one or two seconds), an impact signal is issued 606. In some embodiments, a camera captures 608 pictures and/or video up until impact. The liquid jets are deployed 610 in the direction of the collision, cushioning the collision. In some embodiments, the system monitors for impact 612 and upon impact 612, the system deploys airbags 614, for example, onion-shaped airbags.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A parachute for controlling descent of an object, the parachute comprising:
   a primary canopy made from a sheet of a first material having a primary canopy air vent centrally located in the sheet of the first material;
   a plurality of primary lines, first end of each of the plurality of primary lines affixed to an edge of the primary canopy and a second end of each of the plurality of primary lines affixed to the object;

a secondary canopy made from a sheet of a second material, the secondary canopy positioned above the primary canopy air vent;

a plurality of actuators; and a plurality of control lines, a first end of each of the plurality of control lines affixed to an edge of the secondary canopy and a second end of each of the plurality of control lines passing through the primary canopy is connected to the object by one of the plurality of actuators such that activation of any one of the plurality of actuators shortens or lengthens an associated control line for providing steering of the parachute.

2. The parachute of claim 1, wherein each of the plurality of actuators is a are spool that is affixed to the object and the second end of each of the plurality of control lines are attached to one spool such that rotation of the spool in a first rotational direction shortens a length of the associated control line and rotation of the spool in a second, opposite rotational direction increases the length of the associated control line.

3. The parachute of claim 1, wherein the secondary canopy further comprises a secondary canopy air vent centrally located in the sheet of the second material.

4. The parachute of claim 1, wherein the first material and the second material are a same material.

5. The parachute of claim 1, wherein the first material and the second material are selected from a group consisting of canvas, silk, Dacron, Kevlar, and nylon.

6. The parachute of claim 1, wherein each of the plurality of actuators is independently controlled by a computer.

7. The parachute of claim 6, wherein the computer is in or on the object.

8. A parachute for controlling descent of a disabled aircraft, the parachute comprising:

a primary canopy made from a sheet of a first material having a primary canopy air vent centrally located in the sheet of the first material;

a plurality of primary lines, first end of each of the plurality of primary lines affixed to an edge of the primary canopy and a second end of each of the plurality of primary lines affixed to the disabled aircraft by attachment points affixed to structural members of the disabled aircraft;

a secondary canopy made from a sheet of a second material, the secondary canopy positioned above the primary canopy air vent; and a plurality of control lines, a first end of each of the plurality of control lines affixed to an edge of the secondary canopy and a second end of each of the plurality of control lines passing through the primary canopy is connected to the disabled aircraft by one actuator of a plurality of actuators, each actuator anchored to the structural members of the disabled aircraft such that activation of each actuator shortens or lengthens an associated control line.

9. The parachute for controlling the descent of the disabled aircraft of claim 8, wherein each the plurality of actuators is a spool that is affixed to the structural members of the disabled aircraft and the second end of the control line is attached to the spool such that rotation of the spool in a first rotational direction shortens a length of the control line and rotation of the spool in a second, opposite rotational direction increases the length of the control line.

10. The parachute for controlling the descent of the disabled aircraft of claim 8, wherein the secondary canopy further comprises a secondary canopy air vent centrally located in the sheet of the second material.

11. The parachute for controlling the descent of the disabled aircraft of claim 8, wherein the first material and the second material are selected from a group consisting of canvas, silk, Dacron, Kevlar, and nylon.

12. The parachute for controlling the descent of the disabled aircraft of claim 8, wherein the actuators are controlled by a computer, the computer located in the disabled aircraft and the computer having access to sensors and data of the disabled aircraft.

13. The parachute for controlling the descent of the disabled aircraft of claim 12, wherein the computer reads the sensors and data and operates each actuator of the plurality of actuators to control the actuators and, therefore, a direction and a rate of descent of the disabled aircraft to a safe landing place.

14. The parachute for controlling the descent of the disabled aircraft of claim 8, wherein each of the plurality of actuators are controlled by a computer, the computer is located remotely from the disabled aircraft and the computer has access to sensors and data; the computer reads the sensors and the data from the computer that is located remotely, and the computer that is located remotely controls a direction and a rate of descent of the disabled aircraft to a safe landing place.

* * * * *